No. 871,063. PATENTED NOV. 26, 1907.
G. F. STEWART.
MACHINE FOR MAKING PAD COVERS.
APPLICATION FILED JULY 13, 1906.

6 SHEETS—SHEET 1.

Witnesses:
Irving U. Townsend
Robert H. Kammler

Inventor:
George F. Stewart
By Emery and Booth
Attorneys

No. 871,963.  
PATENTED NOV. 26, 1907.  
G. F. STEWART.  
MACHINE FOR MAKING PAD COVERS.  
APPLICATION FILED JULY 13, 1906.

6 SHEETS—SHEET 4.

No. 871,963. PATENTED NOV. 26, 1907.
G. F. STEWART.
MACHINE FOR MAKING PAD COVERS.
APPLICATION FILED JULY 13, 1906.
6 SHEETS—SHEET 5.

Witnesses:
Irving U. Townsend
Robert H. Kammler

Inventor:
George F. Stewart
By Emery and Booth
Attorneys

No. 871,963. PATENTED NOV. 26, 1907.
G. F. STEWART.
MACHINE FOR MAKING PAD COVERS.
APPLICATION FILED JULY 13, 1906.

6 SHEETS—SHEET 6

Witnesses:
Irving U. Townsend
Robert H. Kammler

Inventor:
George F. Stewart
By Emery and Booth
Attorneys.

UNITED STATES PATENT OFFICE.

GEORGE F. STEWART, OF LYNN, MASSACHUSETTS, ASSIGNOR TO MANUFACTURERS MACHINE COMPANY, OF MONTCLAIR, NEW JERSEY, A CORPORATION OF NEW JERSEY.

MACHINE FOR MAKING PAD-COVERS.

No. 871,963.     Specification of Letters Patent.     Patented Nov. 26, 1907.

Application filed July 13, 1906. Serial No. 326,147.

*To all whom it may concern:*

Be it known that I, GEORGE F. STEWART, a citizen of the United States, residing at Lynn, in the county of Essex, State of Massachusetts, have invented an Improvement in Machines for Making Pad-Covers, of which the following description, in connection with the accompanying drawings, is a specification, like letters on the drawings representing like parts.

My invention relates to buffing machines of the type known as the "Naumkeag" machine, adapted and used principally for buffing the bottoms of the soles of boots and shoes.

Naumkeag machines are provided with buffing pads of a disk like shape, usually of rubber, and inflatable to give them the desired rounded and resilient face. These pads are provided with a detachable cover of abradant material and are mounted on the lower ends of vertical spindles by which they are rotated at high speed, the work being presented to the buffing pad by the operator.

The covers for the pads heretofore made are molded at the edges only and fit over the flattened and deflated pad and hence are brought to shape only on and by inflation of the pad. Furthermore, the pads are clamped at a considerable distance in from the periphery of the pad, hence involving a large waste of material in providing the requisite deep lip for the purpose.

My invention aims to obviate the above and other objections to the present machines and will best be understood from the disclosure of the selected form of mechanism herein, said form of mechanism being presented merely as one embodiment of means for placing the invention in practical form.

Figure 1:
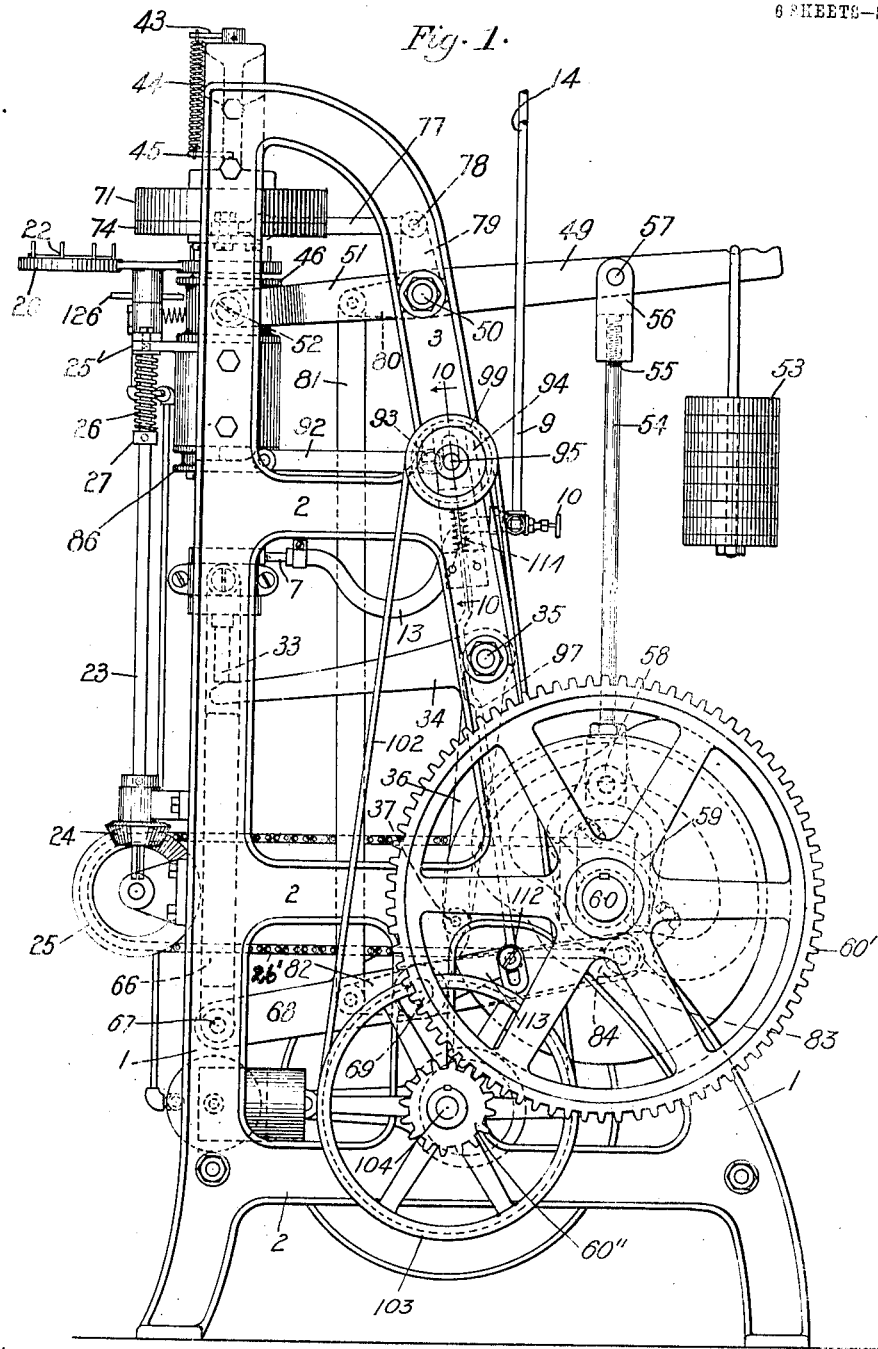
Figure 2:
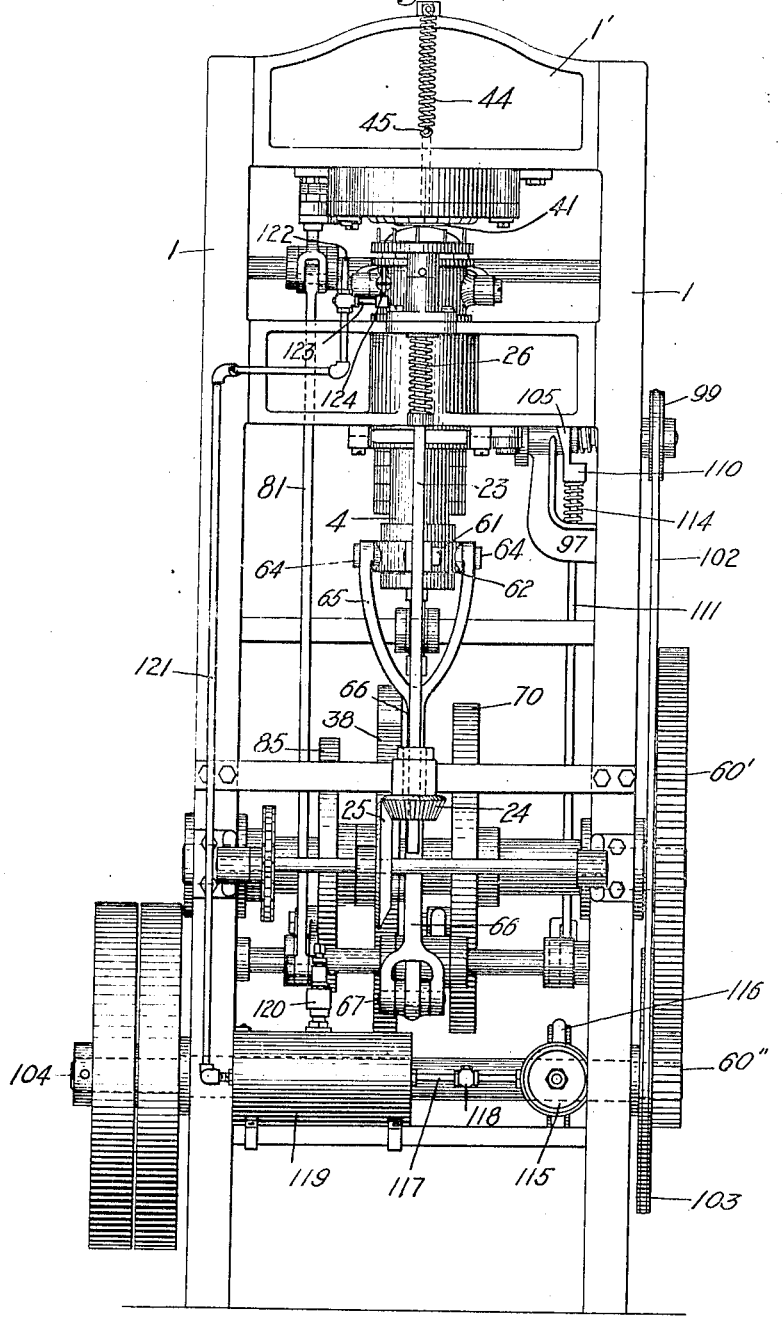
Figure 3:
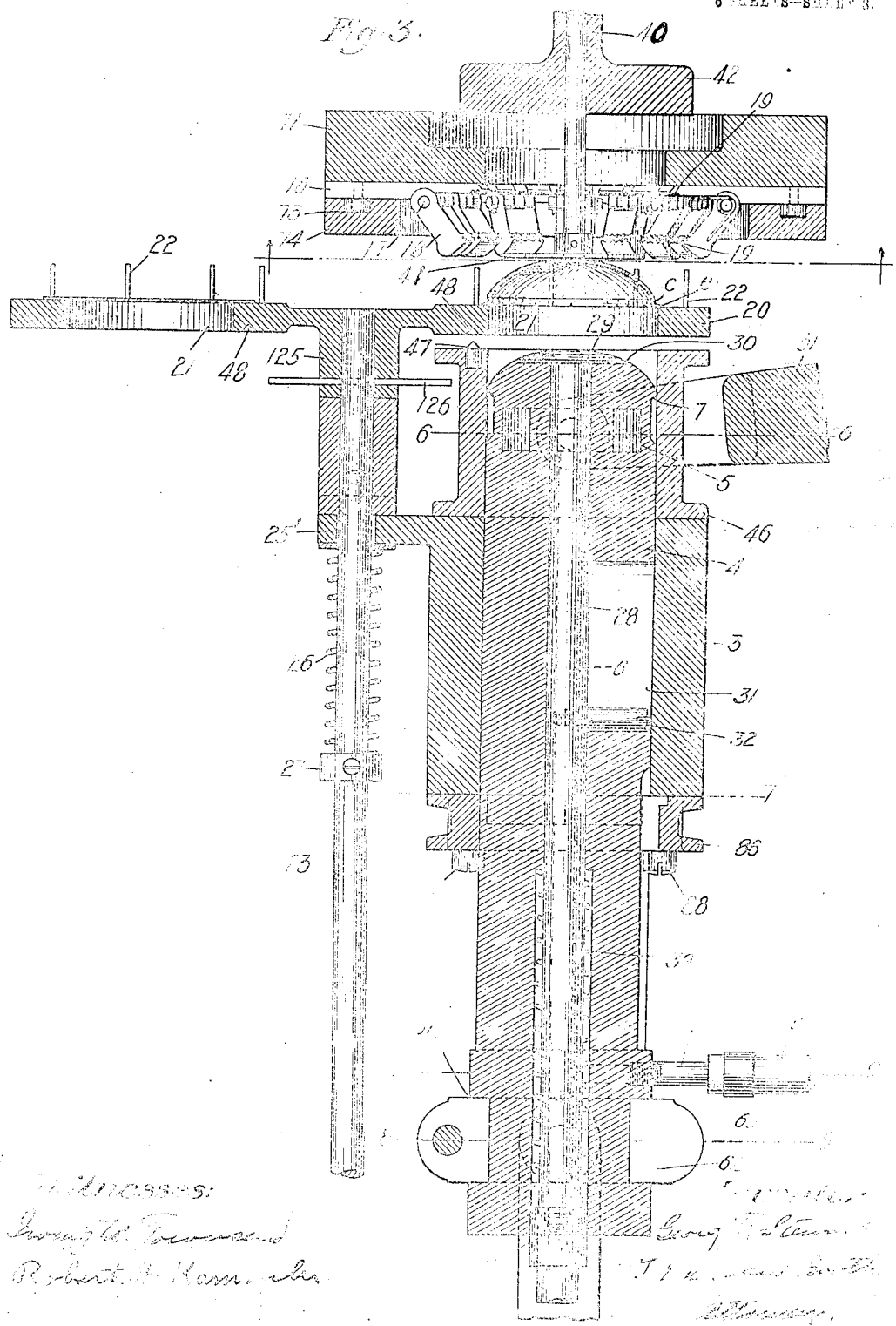
Figure 4:
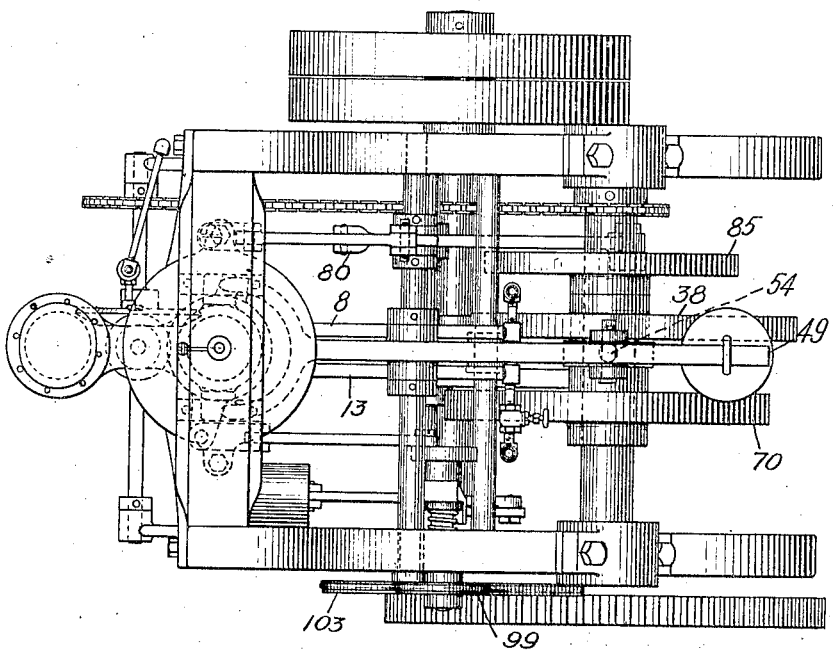
Figure 5:
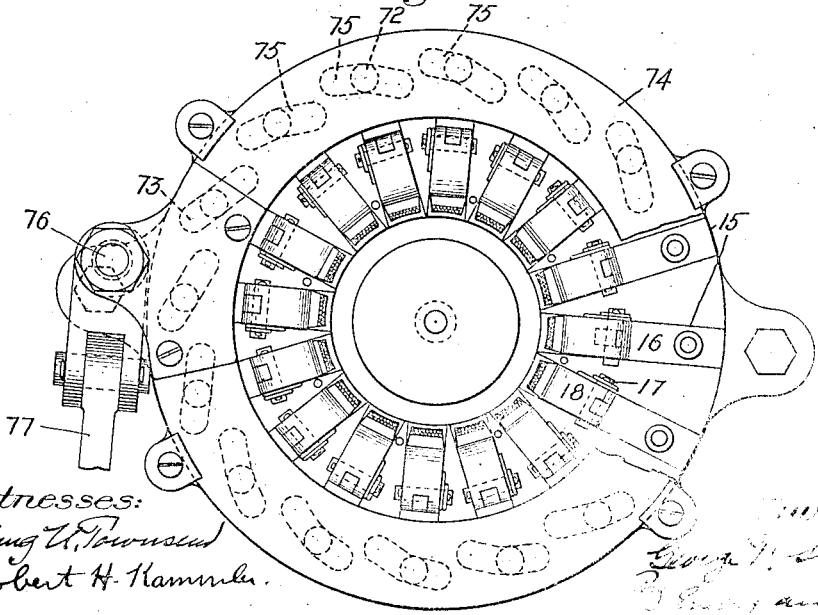
Figure 6:
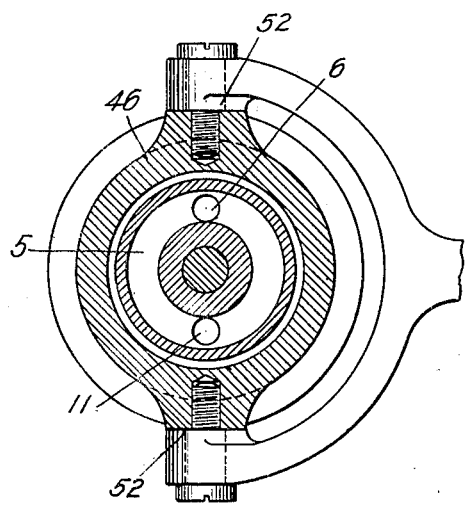
Figure 8:
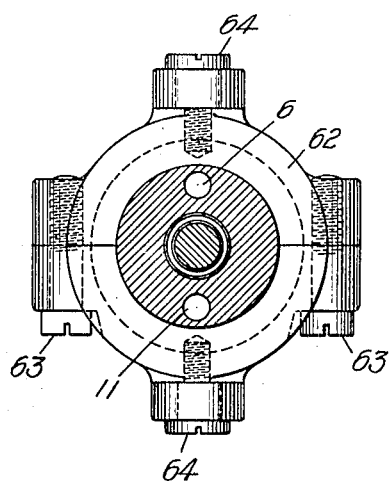
Figure 7:
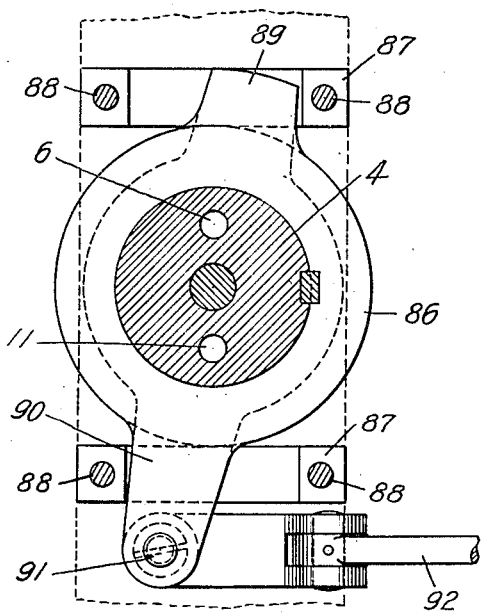
Figure 9:
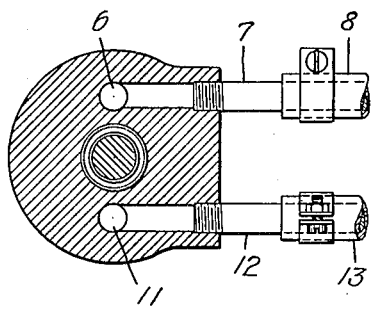
Figure 10:
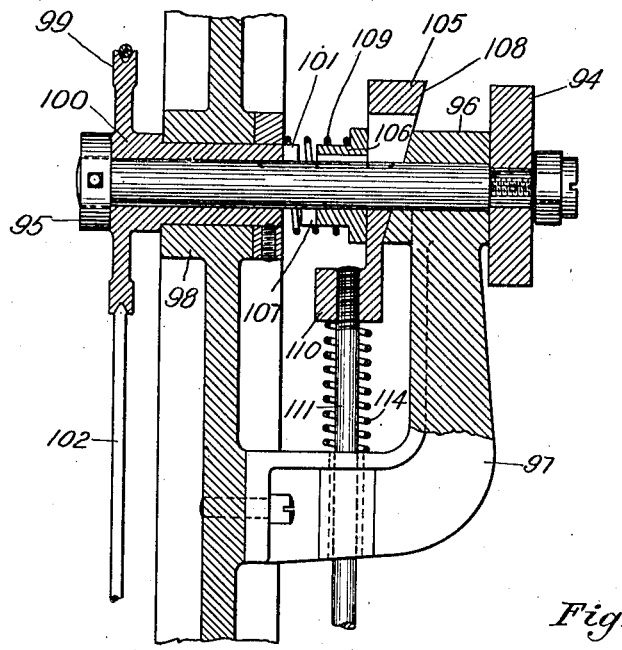
Figure 11:
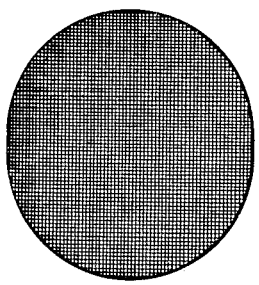
Figure 12:
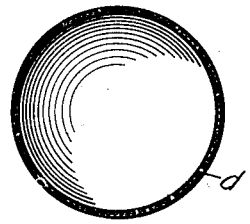
Figure 13:
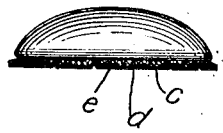

In the drawings:—Figure 1 is a side elevation of a machine embodying my invention; Fig. 2 is a front elevation of said machine; Fig. 3 is a vertical central section, on an enlarged scale, showing the upper portion of the machine; Fig. 4 is a plan view thereof; Fig. 5 is an underneath plan view of the jaws for grasping the margin of the blank to be molded and the means for imparting radial motion to said jaws; Fig. 6 is a horizontal section on the line 6—6 of Fig. 3 and showing the means for operating the jaw closing mechanism; Fig. 7 is a horizontal section on the line 7—7 of Fig. 3, showing the connections for imparting oscillatory movement to the molding plunger; Fig. 8 is a horizontal section on the line 8—8 of Fig. 3 and showing the operative connections for imparting vertical movement to the molding plunger; Fig. 9 is a horizontal section on the line 9—9 of Fig. 3, and showing the means for supplying heating medium to the interior of the molding plunger; Fig. 10 is a vertical section on the line 10—10 of Fig. 1, showing the means for imparting oscillatory motion to the molding plunger when in molding relation; Fig. 11 is a plan showing the blank to be molded; Fig. 12 is a plan view of the under side of the molded form or cover, and Fig. 13 is a side elevation of the molded form or cover.

In the particular embodiment of my invention here selected for illustration the vertical uprights of the supporting standard of the mechanism are shown at 1—1, each of said uprights having cross members 2—2. Suitably supported between the uprights is a cross head 3 shown as provided with a central tubular bearing adapted to receive therein for vertical movement the molding plunger 4, the head of which is preferably provided with a heating chamber 5, to which a heating medium such as steam may be admitted by the vertical passage 6, in the plunger, the lower end of the passage being plugged as shown at 6" in Fig. 3. The heating medium is supplied from any suitable source to the passage 6 by the pipe 7, Fig. 1, flexible connection 8 and pipe 9, provided with a suitable valve 10. The plunger is provided with a return steam passage 11, Fig. 9, connected with the pipe 12, flexible connection 13 and return steam pipe 14.

Alined with and above the molding plunger is a series of margin blank controlling devices 15 Fig. 5, here shown as jaws, adapted to engage or grasp the margin of the blank to be molded and to positively control and position the same during the molding action of the plunger. Said jaws are preferably arranged in a curved path conforming to the outline of the blank to be molded and are radially positioned as clearly shown in Fig. 5. Each grasping or holding device is composed of a pair of jaws, here shown as an upper jaw 16, to which is pivoted at 17 a lower jaw 18, adapted by its weight to assume a non-operative position as shown in Fig. 3. The function of the jaws being to positively control the margin of the blank while the same is subjected to molding action, I preferably provide one or both of the members of each pair of jaws with locking surfaces here shown as co-acting grooves 19 so that the margin of the blank may be tightly grasped. To insure the most effective gripping action, I have provided a groove or grooves extending transversely of the face of the jaw at its gripping portion and other grooves intersecting the same at substantially right angles (see Fig. 3), so as in effect to form pyramidal projections or points.

While a blank to be molded may be placed by hand so as to be engaged by the holding jaws when the same are closed, I preferably provide means to present the blank to the action of said jaws. In Figs. 3 and 4 I have shown means which may be employed for this purpose and comprising a rotatable carrier 20, preferably having therein a plurality of openings 21, each of which may if desired be provided with pins 22 to surround more or less and position the blank while upon the carrier. The carrier (Fig. 3) is mounted upon the top of the upright shaft 23, to which an intermittent rotative motion is imparted in any suitable manner as by the bevel gears 24, 25, shown in Fig. 1, and driven in any suitable manner, as by the sprocket chain 26', the gear 24 being splined upon said shaft 23 so that the latter may slide vertically therein, for a purpose to be more fully described. Said shaft 23 at its upper end is guided in a bearing 25', extending from the tubular bearing 3 referred to. To hold the said shaft and its carrier normally and yieldingly depressed a spring 26 surrounds the same between its bearing and a collar 27 on said shaft.

As above stated, I preferably provide at least two openings 21, over each of which a blank may be positioned so that when one opening is being brought into alinement with the molding plunger the operative may supply one or more blanks to the carrier. Inasmuch as the effective molding action usually occupies from eight to ten seconds, it is possible for an operative to tend a gang of machines, keeping the carriers thereof supplied with blanks. I may, however, provide automatic means to feed or supply blanks to the carriers and to that end may place a supply of blanks in a box or container, preferably downwardly inclined toward the carrier, and provide separating means, as fingers, to separate at the proper time the foremost blank, and to hold back the others, the said foremost blank being suitably moved from the others to the carrier and positioned thereon. I may employ an air blast to preliminarily separate the leading blank or blanks, acting if preferred in advance of the fingers.

The carrier having been rotated so that a blank thereon has been brought into alinement with the molding plunger, it is necessary to deliver the blank to the folding jaws so that as the same are closed they may grasp the margin thereof. Any suitable means may be employed for this purpose, and I may, if desired, so construct the carrier that the same will deliver the blank to said jaws. I prefer, however, to provide means to deliver the blank from said carrier to the jaws and to that end have provided the molding plungers with a suitably located rod 28, and having an axial movement which is at times independent thereof. The head 29 of this rod is seated within a depression 30 in the head of the molding plunger and has a curved contour conforming to and constituting a part of the molding plunger. That the proper blank delivery movement may be imparted to the rod 28, and that the same may rise independently of the molding plunger 4 during such movement, I have provided the molding plunger 4 with a slotted portion 31, Fig. 3, within which is guided the screw 32, extending laterally from the rod 28 and constituting the means whereby said rod is rotated or oscillated in unison with the plunger during the molding operation as will be more fully described.

The lower end 33 of the rod 28 is adapted to be engaged by the arm 34 of a bell crank lever (Fig. 1) pivoted at 35, the other arm 36 of said lever having thereon a roller 37 positioned in a cam track provided in the face of the cam 38, shown more clearly in Fig. 2, whereby upon rotative movement of the cam the rod 28 has imparted thereto a vertical movement to cause it to lift a blank from its position upon the carrier into engagement with the under faces of the upper jaws, the lower end of the rod 28 being normally held in engagement with the lever arm 34 by a surrounding coiled spring 39 (Fig. 3). That the blank may be fully controlled during its delivery movement to the jaws I preferably provide an upper yielding presser 40, (shown in Fig. 3) provided with a head 41. Said presser is guided in the bearing 42 in the head of the machine and its upper end is preferably provided with a pin 43, to which one end of a coiled spring 44 is secured, the other end thereof being secured to a pin 45 in the frame of the machine to normally maintain the said presser in a depressed position but with a yielding or light pressure. In Fig. 3 the said presser is shown at the limit of its downward movement.

The blank having been lifted by the rod head 29 into engagement with the lower faces of the upper jaws, the said rod head is preferably retained in engagement with the blank until the molding plunger 4 is brought up also into molding relation, although if desired the said rod may be returned to the position shown in Fig. 3 after the jaws have been closed upon the margin of the blank before the molding plunger has completed its rising movement.

Any suitable mechanism may be provided to bring the jaws into grasping or holding relation to the margin of the blank. I prefer, however, to utilize the rotatable feeding carrier for this purpose and to this end I impart a vertical movement thereto, the carrier in such movement encountering the lower faces of the outer ends of the lower jaws and lifting them into close grasping relation with the margin of the blank which has been previously brought into engagement with the lower faces of the upper jaws by the rod 28. In such vertical movement of the carrier 20 the pins 22 thereon pass between the lower jaws and into openings provided for that purpose in the jaw carrying head. Vertical movement may be imparted to the carrier in any desired manner, I having here shown for that purpose a sleeve 46 surrounding the molding plunger and having upon its upper face a dowel pin 47, adapted to engage the proper hole 48 in the lower face of the carrier when the parts are alined, thereby insuring certainty of action.

As a form of mechanism for imparting vertical movement to the sleeve 46, I have (see Fig. 1) provided a lever 49 pivoted at 50. The inner arm 51 thereof is forked (Fig. 6) and is connected as at 52 to the sleeve 46 and the outer arm of the lever carries a weight or a series of weights 53, the action whereof is to swing the lever about its pivot 50 and thereby to elevate the sleeve and the carrier to bring the jaws into grasping relation with the blank as has been previously described. Inasmuch as the jaws must be retained in grasping relation with the margin of a blank during the molding action thereof, I preferably provide means co-acting with the weight 53 to hold the sleeve elevated during the molding action. In Fig. 1 I have shown for this purpose a link 54, the upper screw threaded end 55 of which is secured to a head 56 pivoted at 57 to the said lever 49. At its lower end said link 54 is provided with a cam roller 58, positioned in a groove in one face of the cam 38, the link being guided during such vertical movement by the fork 59 embracing the shaft 60, whereon the cam is mounted, said shaft being preferably rotated by suitable gears 60' and 60''.

The margin of the blank to be molded having been grasped by the molding jaws and the said jaws being retained in their grasping relation, the molding plunger now receives a vertical movement to bring the same into molding relation. For this purpose the plunger has a circumferential groove 61, in this instance near its lower end, Fig. 3, in which is loosely mounted a split ring 62 (see also Fig. 8). The ring when lifted will transmit its lifting movement to the plunger. To said split ring (see Fig. 2) is connected by bolts 64 the upper forked end 65 of a link 66, the lower end of which is connected at 67 to the outer arm 68 (Fig. 1) of a lever loose upon the rock shaft 69, jointed in the frame, the inner end of said lever being provided with a roller or projection adapted to engage a cam groove in one face of the cam 70 (see Fig. 2) whereby in the rotation of said cam the proper lifting movement may be imparted to the molding plunger to bring the same into molding relation. In its upward movement said plunger engages the under face of the blank the margin of which is tightly grasped and positively controlled by the jaws and in its continued upward movement it carries with it the rod 28, lifting the same from the lever 34, and stretches and molds the body of the blank into a form corresponding to that of the heads of the plunger 4 and rod 28, which in the present instance are essentially convex and constitute in effect part of a single molding plunger. As previously stated, the body of the blank is stretched and molded by this plunger so that it may conform in shape to the operative portion of a non-deflated buffing pad. That is to say, by the molding action of the molding mechanism the blank is molded into operative form, being that form which it must assume when upon the buffing pad and when the latter is in operation.

It has been discovered that to produce a cover for a buffing pad having the form that it must assume in operation, the blank to be operated upon should not be truly circular but essentially elliptical, as shown in Fig. 11. Experiments have shown that a truly circular blank results in a deformed pad cover when molded, owing to the fact that the blank stretches unevenly during the molding action. Such uneven stretching is due to the fact that some of the threads of the emery cloth preferably employed for this purpose tend to stretch during the molding action more than others. It is to meet this contingency that the elliptical form of blank has been selected, though my invention is not in any sense restricted to the use of such a blank.

It will be observed that in the present form of mechanism the molding mechanism operates beneath the blank and, therefore the blank may be placed or fed upon the carrier with the abrasive side uppermost. This relation of parts renders it convenient for the operative, when hand feeding is resorted to, to take a blank, wet it if he wishes on the underside and, without reversing the same, place it in position upon the carrier. It may be here stated that it is unnecessary to moisten the entire lower surface of the blank prior to the molding action but as a rule only the central portion thereof. Since a heated molding plunger is employed, and, the blank having been moistened, generates steam between the plunger and the lower face of the blank that is being molded during the molding action, such steam may the more readily escape through the molded form or cover when the plunger operates from beneath with no obstruction presented upon the upper face of the molded form to such escape, than when the pad cover is reversely molded.

Inasmuch as the jaws tightly grasp the margin of the blank and positively control the position of the margin of the blank that is being molded, I have in the form of mechanism which I have here illustrated as one embodiment of my invention, caused to be imparted what I term a compensating movement to the jaws during the molding action, such movement being an inward radial movement thereof to thereby feed the margin of the molded form inwardly. Inasmuch as the blank is of elliptical contour, as above described, and, inasmuch as a blank during the molding action tends to stretch unevenly, I have provided means whereby those jaws which engage the margin of the blank at or near the longer axis thereof, have a faster compensating movement imparted thereto than the compensating movement of the remaining jaws. In Fig. 5 I have illustrated one form of mechanism for imparting this so-called compensating movement to the grasping jaws. The upper jaws 16 are guided in suitable guide ways in a head 71, each jaw being provided with a pin or projection 72, adapted to engage an inclined groove or track 73 in a ring 74, to which a slight partial rotation is imparted at the desired time to move said jaws radially inward. The cam grooves that control the inward movement of such jaws as engage the blank at or near the longer axis thereof have an inclination or curvature as indicated at 75, corresponding to the rate of movement which it is desired to impart to said jaws with relation to those jaws that engage a blank at or near the shorter axis thereof.

To impart the described movement of partial rotation to the ring 74, the same is connected by a bolt 76 to a link 77, which is connected at 78 (see Fig. 1) to the upper arm 79 of a bell crank lever pivoted loosely upon the shaft 50, the other arm 80 of said bell crank lever being connected by a link 81 to one arm 82 of a lever fast upon the rock shaft 69, the other arm 83 of said lever being provided with a roller or projection 84 playing in the cam path in one face of the cam 85. Said cam way is so designed as to impart at the proper time the described compensating movement to the grasping jaws and to return said jaws after the molding action to their outward position. I preferably impart to the molding plunger 4 and also to the rod 28 a rotative movement, while said plungers are in molding relation, to prevent burning or over heating of the blank and consequent softening of the glue during the molding thereof, and also so to speak to iron the cover to shape. While the said plunger and rod may have any desired rotative movement, I prefer to oscillate the same and to that end have provided a sleeve 86, shown in vertical section in Fig. 3 and in horizontal section in Fig. 7, splined upon the plunger 4, so that in its vertical movement the molding plunger may move relatively to the sleeve. The said sleeve 86 is retained in position by U shaped brackets 87, shown in Fig. 7, and secured by bolts 88 to the bearing 3. Said sleeve is provided at one end with a projection 89 for guiding movement within the bracket 87 and at its other side with a projection 90 to which is secured at 91 a link 92, by a loose connection permitting the proper movement of the parts. Said link 92 at its other end is connected by a pin 93 (see Fig. 1) to a crank 94, (see Fig. 10) fast upon a shaft 95 mounted in a bearing 96 upon the bracket 97 and in a bearing 98 upon the main framework. Upon said shaft is loosely carried a pulley 99, having a hub 100, provided at its opposite end with a tooth or projection 101. The said loose pulley 99 is continuously rotated by the band 102, passing about a pulley 103 on the main drive shaft 104.

In order that the loose pulley may be clutched to the shaft 95 at the proper time to thereby rotate the crank 94 and impart oscillatory motion to the sleeve 86, I have provided a sliding wedge block 105, positioned between the bearing 96 and the sleeve 106, the latter being splined on the shaft 95, said sleeve being provided with a tooth or projection 107 adapted to be brought into operative relation with the tooth or projection 101 upon the hub of the loose pulley. The sliding wedge block 105 is provided with a wedge face 108, engaging with a corresponding face upon the bearing 96, and is suitably slotted so that downward sliding movement or movement transversely of the shaft 95 may be imparted thereto thereby to wedge or force the sleeve 106 along said shaft, so that the tooth 107 thereof may be brought into operative relation with the tooth 101 of the loose pulley. When said teeth have been brought into operative relation, the described oscillatory movement is imparted through the shaft 95, the crank 94 and the link 92 to the sleeve 86 whereby the molding plunger is oscillated as described. Between a shoulder upon the sleeve 106 and the bearing for the shaft is provided a coiled spring 109 acting when the sliding block has been restored to the position shown in Fig. 10, to throw the sleeve to the right viewing said figure, thereby throwing the tooth 107 out of engagement with the tooth 101. In order at the proper predetermined time to depress the sliding block 105 to clutch the loose pulley to the shaft 95, I have connected to a projection 110 upon said block a link 111, said link being connected at its lower end by a pin 112 to an arm 113, of a lever upon the rock shaft 69. The lower end of said link 111 is slotted to embrace the pin 112 (Fig. 1) and to permit a slight downward motion of said lever arm 113 before the said lever imparts to the link and to the sliding wedge block the described movement. Between the bracket 97 and the extension 110 of the sliding block is a spring 114, tending to restore the block to the position shown in Fig. 10. After the blank has been molded as described into its operative form the molding plunger 4 and the rod 28 are withdrawn therefrom, the molding plunger 4 preceding in its descending movement for a portion of its descent the movement of the said rod, the effect of this retardation being that the said rod strips the molded form from the head of the descending molding plunger. The rod then continues its descent and leaves the molded form upon the carrier 20 in the position shown in Fig. 3, so that upon the next movement of partial rotation imparted to the carrier said molded form is conveyed from alinement with the molding mechanism. I prefer to eject the molded form or cover from the carrier while the same has imparted thereto its rotative movement and to this end may employ any suitable devices. As merely one embodiment of a mechanism adapted for this purpose I have mounted upon the framework of the machine, as shown in Fig. 2, an air pump 115, suitably operated as by an eccentric 116, from the main drive shaft of the machine. Said air pump is connected by a pipe 117 having a check valve 118 therein to an air reservoir 119, having thereon an escape valve 120 of any desired type. A pipe 121 leads from said reservoir 119 and terminates in a jet or nozzle 122 (see Fig. 2) so positioned with respect to the carrier that in the outward or delivery movement of the molded form the same is brought above said jet or nozzle. The pipe 121 is provided with a normally closed valve 123 which is adapted to be opened by a lever 124 suitably mounted upon the framework of the machine. Upon the sleeve 125 of the carrier is provided a pin 126, and in the described movement of the carrier said pin encounters an arm of said lever 124 thereby momentarily opening the valve 123 and permitting a jet of air to remove the molded form from the carrier, the valve being closed again in any suitable manner as by a spring.

Viewing Figs. 3, 12 and 13, it will be observed that as before described the blank has imparted thereto during the molding operation a form or contour which is substantially that conforming to the form or contour of the buffing pad when in operation. That is to say, the molding plunger imparts to the blank substantially the final operative form which the cover assumes when in position upon the buffing pad and when in operation. The margin of the pad that is grasped by the jaws is during the molding operation held in close engagement with the annular shoulder 7, formed at the base of the head of the molding plunger, the effect being that the form at its margin is molded so as to present an encircling channel $c$, the bottom of which extends inwardly or toward the center as shown. What may be termed the outer wall $e$ of the molded form or cover is flared outwardly, said outer wall of the channel thus extending to the perimeter of the cover. As shown in said Fig. 3, the outer wall of said channel is of greater extent than the inner wall thereof, although my invention is not limited to such a construction. By this construction and the outward flare which is imparted during the molding action to the perimeter of the cover the said cover may be the more readily applied to the buffing pad inasmuch as said construction prevents the margin of the cover from being bent under during the application thereof to the pad.

I have by experiment ascertained that I may avoid wetting the margin of the blank before molding the same, and yet may retain the margin in its molded form with great certainty, by corrugating, ridging or ribbing at intervals the margin. Other advantages to be more fully described are also secured. The described corrugating or ridging of the margin may be secured by slightly spacing the pairs of margin grasping jaws so that they do not grasp the entire margin of the blank. In the inward movement of the said jaws whereby the margin has imparted thereto the described compensating movement, the material of the margin between the jaws is thus ridged or corrugated or ribbed, as shown at $d$ in Figs. 12 and 13. Said ridges or ribs or corrugations extend essentially transversely of the encircling channel $c$ and so strengthen the margin that the same retains the described molded form that is imparted thereto. While it is not essential that I provide the strengthening ribs, ridges or corrugations referred to, I consider the same desirable for the purpose stated.

Having thus described one form of mechanism for operating upon blanks to mold the same into covers for buffing pads, I wish it to be understood that said mechanism is but one specific embodiment of my invention, that the same is illustrative only and that, although I have described the same specifically the terms employed by me are not used in their specific or restricted sense but in their general nature. I am, therefore, not limited save as the invention is defined in the claims, inasmuch as the mechanism shown may be widely departed from within the spirit and scope of the claims.

The pad cover produced which has been made the subject of a divisional application is advantageous because, among other things, it requires a minimum of material from which to produce it; it presents a continuous clamping lip; its clamping lip is corrugated or undulated to make it adaptable or conformable in the act of clamping; its clamping lip is strengthened and set by transverse ribs and ridges which not only aid in pressing to shape the lip however formed but are particularly useful in facilitating the contraction of it circumferentially in clamping and in rendering it unnecessary to dampen the fabric throughout.

By providing a continuous slightly flaring lip the application of the cover to the pad is facilitated and less flare is required to be removed during the enfolding action and there are no serrations or tongues to be bent, some in one direction and others in a different direction. The transverse ribs or ridges also permit of an elastic enlargement of the margin of the cover in applying it in position.

From the construction described and the acts or series of acts performed, it will be noted that it is unnecessary to wet the margin of the blank to insure the proper set of the molded margin, since by ridging or corrugating the same the margin is strengthened and held from deformation; by ridging or corrugating the margin there is provided a capacity for elastic enlargement for the application of the cover to the pad; by flaring the margin in the process of manufacture the application thereof to the pad is rendered more easy; and by providing a continuous margin the application of the cover is facilitated. It is apparent that by controlling the margin of the blank during the molding thereof, a cover is obtained of the proper form; that by moving or feeding the margin radially inward during the stretching incidental to the molding action deformation is prevented; that if the cover be subjected to a so-called ironing action during the molding operation the proper shaping thereof is facilitated; and that by heating the blank while the same is being molded, the proper formation of the cover is facilitated. By molding the cover so that the operative face thereof conforms substantially to that of a non-deflated pad or a pad which, when in operation, has a substantially convex shape, it is possible to apply the cover to the pad when the latter is in operative form or condition. That is to say, by molding not only the margin but also the operative face of the cover, it is not necessary to rely upon inflating the pad to force the cover into final or operative form.

Claims.

1. In a machine for molding buffing pad covers, the combination of pad cover molding means, means engaging the margin of the blank while being treated by the molding means, and delivery means operatively positioned with relation thereto for positioning the blank for engagement by the margin engaging means.

2. A machine for molding buffing pad covers comprising molding mechanism, means for controllably holding the margin of a blank while being molded thereby, and delivery means to present a blank to said margin controlling means.

3. A machine for molding buffing pad covers comprising molding mechanism, margin controlling means operatively positioned with relation thereto, delivery means to present the blank to said margin controlling means and a carrier to receive and carry the blank to said delivery means.

4. A machine for molding buffing pad covers comprising margin controlling means to engage and positively hold the margin of a blank, molding means to mold the blank while its margin is so held and controlled and movement imparting means to impart to the positively held margin a compensating movement during the molding action.

5. In a machine for making buffing pad covers, the combination of molding means to impart to a blank the general form it is to have upon the pad, blank holding means to engage and positively hold the margin of the blank, and means to positively move the margin of the blank radially inward to compensate for the molding action.

6. In a machine for making buffing covers, the combination of molding means to impart to a blank the general form it is to have upon the pad, blank holding means disposed in non-circular relation to engage the margin of a blank, and means to positively move the margin of the blank inward to compensate for the molding action and convert a non-circular blank to a molded cover of circular form.

7. A machine for molding buffing pad covers comprising clamping jaws for the margin of a blank, molding means to mold the blank while unyieldingly clamped therein, and compensating means to impart movement to said jaws during said molding action to carry the marginal portions of the blank positively inward.

8. A machine for molding buffing pad covers comprising margin engaging means for a blank to be molded, molding means to mold the blank by a stretching action and radially acting means to impart an inward movement to said engaging means during and to compensate for the stretching action.

9. A machine for molding buffing pad covers comprising margin holding means to act upon the margin of a blank while being molded, delivery means to present a blank to said holding means, positioning means to move said holding means into engagement with the margin of the blank and molding means for the blank.

10. A machine for molding buffing pad covers comprising margin holding means to engage the margin of a blank while being molded, a blank carrier, delivery means to present a blank therefrom to said holding means when the latter is in inoperative position, positioning means to move said holding means into operative position, and molding means to mold said blank.

11. A machine for molding buffing pad covers comprising margin holding means to act upon the margin of a blank while being molded, a blank carrier, delivery means to present a blank therefrom to said holding means while the latter is in inoperative position, carrier moving means to render said holding means operative, molding means for said blank, and discharging means to eject the molded form.

12. A machine for molding buffing pad covers comprising margin holding means to act upon the margin of a blank while being molded, a blank carrier, delivery means to present a blank therefrom to said holding means, while the latter is in inoperative position, carrier moving means to render said holding means operative, molding means for said blank, and discharging means to eject the molded form from the carrier.

13. A machine for molding buffing pad covers comprising margin engaging means to act upon the margin of a blank while being molded, a rotative carrier, intermittently acting means to impart step by step movement thereto, and carrier moving means to move the same axially and thereby bring the margin engaging means into operative position.

14. A machine for molding buffing pad covers comprising margin holding means to act upon the margin of a blank while the same is being molded, a rotative carrier and intermittently acting means to impart step by step movement thereto, delivery means to present the blank to said holding means and carrier moving means to move said carrier axially and thereby bring said holding means into operative position.

15. A machine for molding buffing pad covers comprising margin holding means to act upon the margin of a blank while the same is being molded, and a molding plunger having a portion thereof independently operative to deliver the blank to said holding means.

16. A machine for molding buffing pad covers comprising margin holding means to act upon the margin of a blank while the same is being molded, a blank carrier, and concentrically arranged means acting to deliver the blank from the carrier to the holding means, to bring said holding means into operative position and to mold said blank.

17. A machine for molding buffing pad covers comprising molding means, means for holding the margin of a blank while being molded, and a blank presenting and removing carrier adapted to receive a plurality of blanks and to present the same singly to the action of the molding mechanism.

18. A machine for molding buffing pad covers comprising molding means, margin engaging means to act upon a blank while being molded, a blank carrier to present a blank to the path of movement of the molding means and carrier moving means to move said carrier and thereby bring the margin engaging means into operative position.

19. A machine for molding buffing pad covers comprising retaining means to engage and hold the margin of a blank while being molded, a molding plunger, and stripping means movable axially of the plunger to remove the molded form from the plunger.

20. A machine for molding buffing pad covers comprising retaining means to engage and hold the margin of a blank while being molded, a carrier upon which the blank may be placed by the operative, delivery means to present a blank therefrom to said blank engaging means, and delivery means to restore the molded form to the carrier.

21. A machine for molding buffing pad covers comprising retaining means to engage a blank to be molded, a molding device, means for heating the same, co-acting means to impart molding action to the molding device, and ironing movement imparting means to act upon said molding device while in molding relation.

22. A machine for molding buffing pad covers comprising, in combination, molding means to impart to a blank the shape it is to have on the pad, radially movable means co-operating therewith to form a corrugated outwardly flaring marginal portion for said blank and actuating devices for said radially movable means.

23. A machine for molding buffing pad covers comprising blank molding means, and a series of spaced margin engaging devices co-acting therewith and means to move said margin engaging devices inward during the molding action.

24. A machine for molding buffing pad covers comprising blank molding means and an encircling series of spaced margin controlling jaws co-acting therewith during the molding action.

25. A machine for molding buffing pad covers comprising blank molding means and margin controlling means to grasp the margin of the blank during the molding action, said margin controlling means having pinnacled faces and means to move the margin controlling means inward during the action of the molding means.

26. A machine for molding buffing pad covers comprising molding means to mold the body of a blank within the margin thereof and margin holding means, and operating devices to move the same radially inward in the formation of an outwardly flaring ridge portion and a channel portion between the said ridge portion and body of the molded cover.

27. In a machine for molding buffing pad covers comprising means for molding the body of a blank, means for positively holding the marginal portions of the blank against slip, and means for unequally moving the marginal holding means radially inward during the molding action.

28. In a machine of the character described the combination of a molding plunger, a plurality of jaws for engaging and positively holding the marginal portions of a blank against slip, means for operating the plunger, and means for moving the said jaws inward during the molding action of the plunger.

29. In a machine of the character described, the combination of a molding plunger having a heating chamber, means for operating said plunger, jaws for engaging and positively holding the marginal portions of a blank, and means for moving said jaws inward while positively holding the blank.

30. In a machine of the character described, the combination of a plunger 4, jaws 16 and 18 for engaging the marginal portions of a blank, means for operating the plunger, and means to move the jaws inward to compensate for the molding action of the plunger.

31. In a machine of the character described, the combination of a molding plunger, means to engage the marginal portions of a blank to be molded, a rod movable longitudinally of the plunger to position a blank with relation to the marginal holding means, and means to operate the plunger.

32. In a machine of the character described, the combination of a molding plunger, a carrier 20 having a passage way for the movement of the plunger therethrough, means for clamping the marginal portions of a blank disposed to one side of the carrier, and means for moving the plunger into molding engagement with said blank.

33. In a machine of the character described, the combination of a molding plunger having a heating chamber, means for holding the marginal portions of a blank above said plunger, means for moving the plunger into molding engagement with the blank, and means for moving the plunger about its axis while in contact with the blank.

34. In a machine of the character described, the combination of a molding plunger, a carrier 20 having blank holding portions, means to move the carrier to bring a blank into position with relation to the plunger, means to clamp the margin of a blank, means for moving the blank from the carrier into position to be engaged by the margin clamping means, and operating means for the plunger.

35. In a machine for molding buffing pad covers, the combination of blank holding means, a molding plunger in coöperating relation therewith, a blank carrier, means for moving said carrier to present a blank to be molded, and means for also moving said carrier in the direction of molding movement.

36. In a machine for molding buffing pad covers, the combination of blank holding means, a molding plunger in coöperating relation therewith, a blank carrier having blank positioning pins projecting therefrom, means for moving said carrier towards and from the blank holding means in the direction of molding movement.

37. In a molding machine, the combination of blank holding means comprising a series of jaws, a molding plunger, means for placing a blank to be molded between said jaws, means for thereafter closing said jaws upon the blank and means for relatively moving the plunger and blank holding means to mold the blank.

38. In a molding machine, the combination of blank holding means comprising a series of jaws, a molding plunger, a carrier, means for moving the carrier to place a blank between the plunger and blank holding means, means for taking the blank from the carrier and placing the marginal portions thereof between the said jaws, means for closing the jaws upon the blank, and operating devices to impart relative molding action of the blank holding means and plunger.

39. In a molding machine, the combination of blank holding means comprising a series of jaws, a molding plunger, a carrier, means for moving the carrier to place a blank between the plunger and blank holding means, means for also moving the carrier to cause it to act upon the jaws and close them on the blank, and operating devices to impart relative molding action of the blank holding means and plunger.

In testimony whereof, I have signed my name to this specification, in the presence of two subscribing witnesses.

GEORGE F. STEWART.

Witnesses:
   JOHN J. HEYS,
   JOHN GELZENLICHTER.